Figure 1:
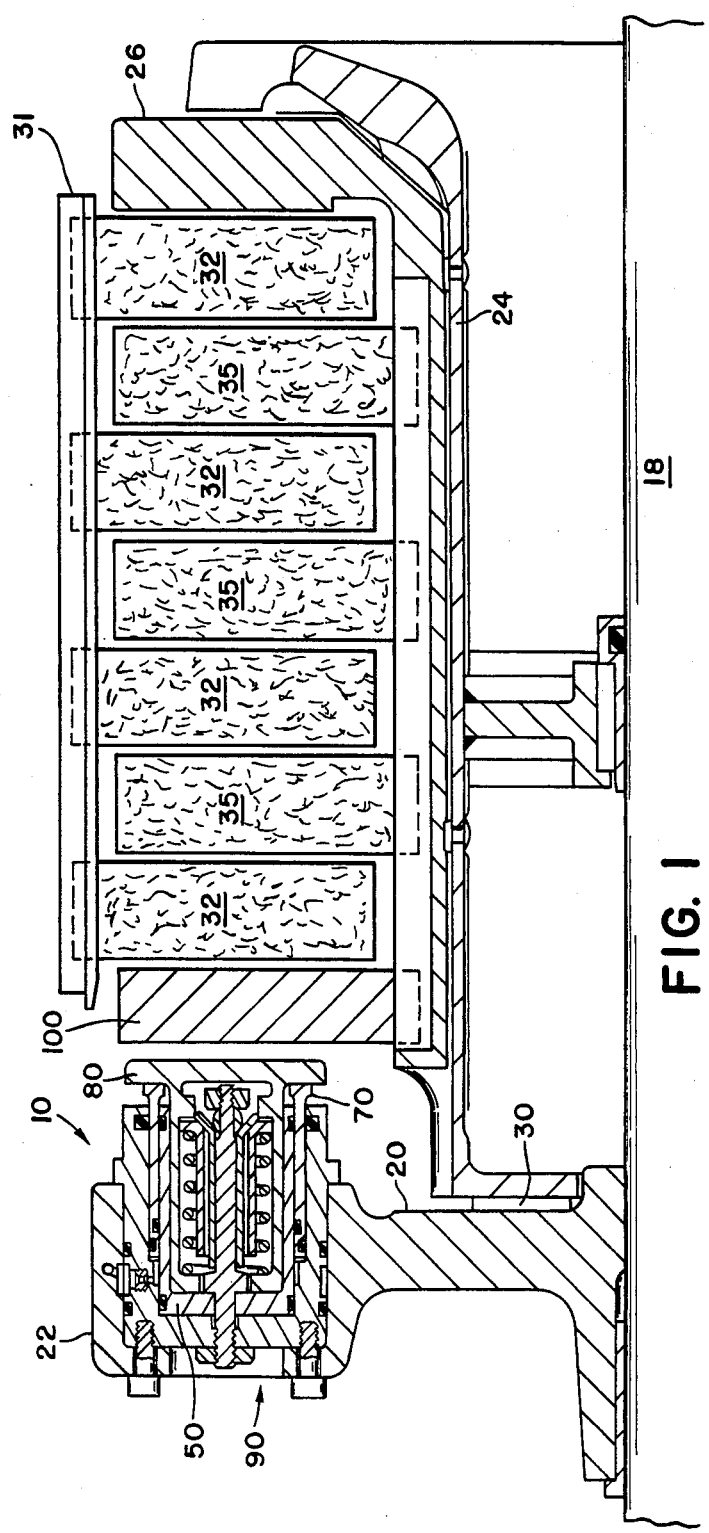

United States Patent [19]

Black

[11] Patent Number: 4,815,359
[45] Date of Patent: Mar. 28, 1989

[54] COMPACT BRAKE PISTON RETURN MECHANISM

[75] Inventor: Raymond J. Black, South Bend, Ind.

[73] Assignee: Allied-Signal Inc., Morristown, N.J.

[21] Appl. No.: 134,416

[22] Filed: Dec. 17, 1987

[51] Int. Cl.[4] .................... F01B 13/14; F15B 15/24
[52] U.S. Cl. .................................... 92/13.1; 92/13.4;
   92/13.7; 92/52; 188/196 R; 188/196 P
[58] Field of Search ............ 188/81.7, 196 R, 196 P;
   92/13.1, 51, 52, 53, 13.6

[56] References Cited

U.S. PATENT DOCUMENTS

| 3,371,753 | 3/1968 | Meier | 188/152 |
|---|---|---|---|
| 3,566,997 | 3/1971 | Heck | 188/196 P |
| 3,643,763 | 2/1972 | Hay | 188/71.8 |
| 3,729,072 | 4/1973 | Borkowski | 188/196 P |
| 3,812,935 | 5/1974 | Pringle | 188/71.8 |
| 3,957,146 | 5/1976 | LeBlanc | 192/11 A |
| 3,958,670 | 5/1976 | Anderson | 188/196 R |
| 3,990,547 | 11/1976 | Plaat | 188/196 R |
| 3,995,721 | 12/1976 | Chambers | 92/51 |
| 4,006,669 | 2/1977 | Price | 188/196 R |
| 4,171,036 | 10/1979 | Plaat | 188/196 R |
| 4,186,825 | 2/1980 | Milliken | 188/196 R |
| 4,192,407 | 3/1980 | Crossman | 188/196 R |
| 4,214,650 | 7/1980 | Crossman et al. | 188/196 R |
| 4,334,597 | 6/1982 | Tovagliaro | 188/71.8 |
| 4,373,614 | 2/1983 | Runkle | 188/196 P |
| 4,449,616 | 2/1984 | Musser, Jr. et al. | 188/71.8 |
| 4,503,950 | 3/1985 | Anderson | 188/196 R |
| 4,529,068 | 7/1985 | Gallo | 288/71.8 |
| 4,587,888 | 5/1986 | Anderson et al. | 92/51 |

FOREIGN PATENT DOCUMENTS

| 105977 | 4/1984 | European Pat. Off. | |
| 1398693 | 3/1965 | France. | |
| 1428249 | 4/1967 | France. | |
| 2311966 | 12/1976 | France | 188/196 R |
| 450517 | 12/1949 | Italy | 188/196 P |
| 1062248 | 3/1967 | United Kingdom | 188/196 P |

Primary Examiner—Robert E. Garrett
Assistant Examiner—Thomas Denion
Attorney, Agent, or Firm—Larry J. Palguta; Ken C. Decker

[57] ABSTRACT

The brake piston return mechanism (10) comprises a housing (22) which includes housing part (50) that forms with the housing a chamber (59) and an axially extending groove (55). Disposed within the axially extending groove (55) and forming a movable portion (58) of the chamber (59) is an annular actuation piston (70). The actuation piston (70) includes a pair of seals (74) to prevent leakage. Within the housing part (50) is a bore (40) enclosing brake tube (80) that includes an interior radially extending flange (84) and an exterior radially extending flange (82). The exterior radially extending flange (82) is engaged by the actuation piston (70). Located within the brake tube (80) is an adjuster mechanism (90). After the brake tube (80) has been displaced by the actuation piston (70) and braking has ceased, the brake tube (80) is returned to a running clearance (A) by way of the adjuster mechanism (90).

10 Claims, 2 Drawing Sheets

COMPACT BRAKE PISTON RETURN MECHANISM

The invention relates to a combination brake piston and return mechanism, particularly for use in aircraft brake assemblies.

Aircraft brake assemblies require automatic adjusters which compensate for brake wear in order to maintain a hydraulic brake fluid volume essentially constant during brake actuation. Prior automatic adjusters include tube adjusters which utilize a pressure plate assembly disposed between the adjuster and the stack of brake members. Such adjusters are disposed externally to pistons in their own separate bores, and engage the pressure plate assembly. Other automatic adjusters are combined with a piston wherein the piston is returned to the running clearance position against brake back pressure. Adjusters disposed internally of the pistons are provided for present-day hydraulic systems which operate at approximately 3,000 psi maximum brake pressure, although in cases where back pressure is high the design may be marginal because it is difficult to provide a large enough spring for the available space to overcome system back pressure.

Future aircraft systems will require much higher hydraulic brake pressures, such as in the order of 8,000 psi. Such pressures require smaller diameter pistons which preclude the use of internal adjusters due to the lack of sufficient space inside the piston to enclose all of the adjuster parts. It is undesirable from a weight standpoint to revert back to using a pressure plate assembly and adjusters disposed externally of the piston, and therefore, a need exists for an automatic adjuster disposed internally of the piston which will fit within the piston of a small diameter piston high pressure system. The present invention fills this need by providing a brake piston return mechanism assembly, comprising a housing having therein a bore, a brake tube disposed slideably within the bore and comprising an exterior radially extending flange and an interior radially extending flange, an axially extending groove disposed radially spaced apart from the bore and communicating with an end of the housing, an actuation piston disposed within said axially extending groove and extending axially outwardly therefrom into engagement with the exterior radially extending flange of the brake tube, and resilient means extending between said interior radially extending flange and an adjuster mechanism located within said brake tube.

Figure 2:
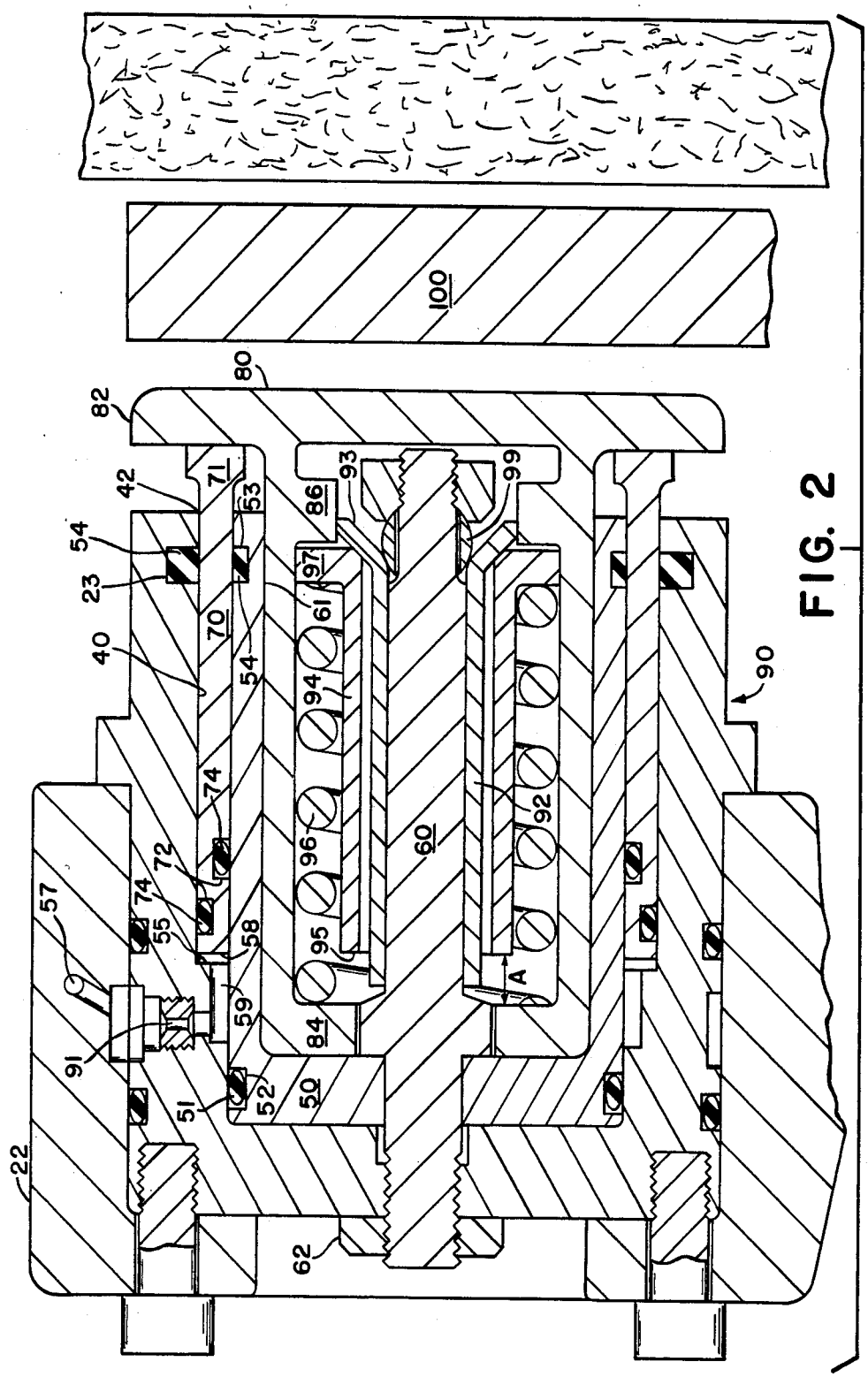

One way of carrying out the invention is described in detail with reference to the drawings which illustrate an embodiment, in which:

FIG. 1 is a sectional schematic representation of an aircraft wheel and disc brake assembly embodying the present invention; and FIG. 2 is an enlarged sectional view of a portion of FIG. 1.

The compact brake piston-return mechanism of the present invention is designated generally by reference numeral 10. An aircraft wheel (not shown) is suitably journalled on a rotatably fixed axle 18 carried by conventional aircraft landing gear structure (not shown). An annular brake carrier 20 is suitably keyed to axle 18 and provided with a plurality of circumferentially spaced-apart housings 22, only one of which is shown, and each suitably vented via a passage to a source of pressurized fluid controlled by the aircraft pilot. A torque tube 24 having an integral backing plate 26 is secured fixedly to carrier 20 by a plurality of circumferentially spaced-apart bolts 30. A plurality of spaced-apart annular brake rotors 32 comprising carbon/carbon composite rotors are suitably keyed to a retaining member 31 secured to the wheel and adapted to permit axial movement of the rotors relative to the wheel. A plurality of annular brake stators 35 comprising carbon/carbon composite stators are suitably keyed for axial movement relative to torque tube 24. The rotors 32 and stators 35 are adapted to be actuated by a plurality of compact brake piston-return mechanisms 10. Upon energization of the mechanisms 10, the stators and rotors are compressed together to retard rotation of the wheel.

The housing 22 of the compact brake piston-return mechanism 10 comprises a bore 40 extending to an open end 42. Received within bore 40 is a housing part 50 having annular groove 52 receiving seal 51. Housing part 50 is anchored within bore 40 by means of retaining pin 60 that is attached to housing 22 by thread and bolt connection 62. The housing part 50 and bore 40 form therebetween an annular axially extending groove 55 which receives fluid pressure via vent 57 and fluid pressure chamber 59. Located within axially extending groove 55 is an annular actuation piston 70 which extends axially outwardly of groove 55 and at the opposite end forms a movable portion 58 of fluid pressure chamber 59. Actuation piston 70 includes a pair of oppositely disposed radial grooves 72 which receive therein seals 74. Housing 22 and housing part 50 include oppositely disposed radial grooves 23 and 53, respectively, which receive therein wiper rings 54 that engage the inner and outer radial surfaces of actuation piston 70. Housing part 50 forms a bore 61 which receives there a brake tube 80. Brake tube 80 comprises an exterior radially extending flange 82, interior radially extending flange 84, and interior abutment 86. Tube 80 is disposed slidingly within housing part 50 and is engaged by end 71 of actuation piston 70. Located within the interior of brake tube 80 is an adjuster mechanism designated generally by reference numeral 90. Adjuster mechanism 90 comprises the retaining pin 60 anchored to housing 22, an adjuster tube 92 disposed about retaining pin 60, spring retainer tube 94 disposed slidably about adjuster tube 92, spring 96 extending between flange 97 of tube 94 and interior radially extending flange 84 of brake tube 80, and expander ball 99 which engages deformably the adjuster tube 92.

The brake piston return mechanism 10 operates so as to effect a running clearance between piston 80 and a pressure plate 100 when a braking application has terminated. Initially, brake pressure is applied and causes an increase in the pressure in chamber 59. This applies an axial force on actuation piston 70 in a direction tending to actuate the brake. Actuation piston 70 pushes on the radially extending flange 82 of tube 80 while tube 80 is also acted upon by spring 96 which biases tube 80 inwardly of bore 61. As the applied pressure in chamber 59 increases, the pressure overcomes the preload force of spring 96 so that actuation piston 70 displaces axially tube 80 and interior radially extending flange 84 engages end 95 of spring retainer tube 94. If the brake stack of rotors and stators has not yet been closed, spring retainer tube 94 will be displaced to the right and push the adjuster tube 92, by means of the flange 93, to the right and cause tube 92 to be deformed by expander ball 99. The movement of tube 80, effected by actuation piston 70, will continue to the right until the brake stack is closed and the brake is fully actuated for the applied pressure.

If the brake stack is closed before the interior radially extending flange 84 engages end 95 of spring retainer tube 94, then retainer tube 94 does not displace axially the adjuster tube 92 against expander ball 99. Adjuster tube 92 will not be displaced until the brake stack wears sufficiently to allow a full excursion of interior radially extending flange 84 over the pull-back gap or running clearance indicated by letter A.

When the brake pressure in chamber 59 is reduced in order to deactuate the brakes, actuation piston 70 and tube 80 move to the left in FIG. 2. Movement continues until the abutment 86 of tube 80 engages flange 97 of tube 94. This is the fully retracted position of the brake wherein the pull-back gap or running clearance A has been effected.

The present invention has substantial advantages over prior piston-return mechanisms. The high brake pressure can be accommodated within the housing while still retaining the integral adjuster concept wherein the adjuster is disposed within the pressure piston. Some conventional designs would require very small pistons and external adjusters. An exception to that is U.S. Pat. No. 4,751,985 owned by the same assignee as herein. The present invention does not require a large pressure dome upon the backside of the piston housing. This saves weight and increases reliability because it reduces potential fatigue problems. The invention includes easily accessible whirl-damp orifices in the piston assembly. A whirl-damp orifice is indicated by reference numeral 91. The assembly requires a low fluid volume which reduces the effect fluid compressibility. This provides for better anti-skid response and better whirl damping. The piston area can be increased or decreased by relatively minor changes in the housing and outer diameter of the actuation piston.

Other provisions of the invention or variations will become apparent to those skilled in the art and will suggest themselves from the specific applications of the invention. It is intended that such variations and revisions of the invention, as are to be expected on the part of those skilled in the art, to suit individual design preference and which incorporate the herein disclosed principles, will be included within the scope of the following claims as equivalents thereof.

I claim:

1. A brake piston return mechanism assembly, comprising a housing having therein a bore, a brake tube disposed slideably within the bore and comprising an exterior radially extending flange and an interior radially extending flange, an axially extending groove disposed radially spaced apart from the bore and communicating with an end of the housing, an annular and axially extending actuation piston disposed within said axially extending groove and extending axially outwardly therefrom into engagement with the exterior radially extending flange of the brake tube, the actuation piston disposed coaxially about the brake tube, and resilient means extending between said interior radially extending flange and an adjuster mechanism located within said brake tube, the actuation piston diposed separate from and coaxially about the adjuster mechanism so that the actuation piston displaces the brake tube which engages and actuates the adjuster mechanism.

2. The brake piston return mechanism assembly in accordance with claim 1, wherein the housing includes a pair of radial grooves communicating with said axially extending groove, the radially extending grooves having wiping means therein which engage the actuation piston.

3. The brake piston return mechanism assembly in accordance with claim 2, wherein the housing and an interior end of the actuation piston have sealing means therebetween.

4. The brake piston return mechanism assembly in accordance with claim 1, wherein a fluid receiving chamber communicates with said axially extending groove and receives fluid pressure for displacing axially the actuation piston.

5. The brake piston return mechanism assembly in accordance with claim 4, wherein the housing includes a whirldamp orifice that communicates with the chamber.

6. The brake piston return mechanism assembly in accordance with claim 5, wherein the housing includes an interior housing part disposed within said housing and forming with the housing the axially extending groove and chamber.

7. The brake piston return mechanism assembly in accordance with claim 1, wherein the adjuster mechanism comprises an engageable member inside said brake tube and frictionally contacting an engaging member, the engaging member anchored to the housing and extending within said brake tube.

8. The brake piston return mechanism assembly in accordance with claim 7, wherein the adjuster mechanism comprises a spring return tube disposed within the brake tube and providing an axially outer shoulder engageable by the resilient means, the spring return tube having an opposite axially inner shoulder engageable by the interior radially extending flange of the brake tube, a distance between the interior radially extending flange of the brake tube and the axially inner shoulder being the running clearance of the assembly.

9. The brake piston return mechanism assembly in accordance with claim 8, wherein the engageable member comprises an adjuster tube disposed about the engaging member which comprises a retaining pin anchored to the housing, the adjuster tube having an axially outer angled end which is engaged by an axially outer angled end of the spring return tube.

10. The brake piston return mechanism assembly in accordance with claim 9, wherein the retaining pin includes an expander ball which engages and deforms the adjuster tube as the adjuster tube is displaced axially by the spring return tube, brake tube, and actuation piston.

* * * * *